(12) United States Patent
Kogetsu et al.

(10) Patent No.: US 7,824,801 B2
(45) Date of Patent: Nov. 2, 2010

(54) NEGATIVE ELECTRODE FOR LITHIUM ION SECONDARY BATTERY, PRODUCTION METHOD THEREOF AND LITHIUM ION SECONDARY BATTERY COMPRISING THE SAME

(75) Inventors: Yasutaka Kogetsu, Suita (JP);
Kazuyoshi Honda, Takatsuki (JP);
Toshitada Sato, Osaka (JP); Hiroshi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 1358 days.

(21) Appl. No.: 11/301,027

(22) Filed: Dec. 13, 2005

(65) Prior Publication Data
US 2006/0134518 A1    Jun. 22, 2006

(30) Foreign Application Priority Data
Dec. 16, 2004    (JP) ............... 2004-364342

(51) Int. Cl.
*H01M 4/58*    (2010.01)
*H01M 4/48*    (2010.01)

(52) U.S. Cl. .................................. 429/218.1
(58) Field of Classification Search ........... None
See application file for complete search history.

(56) References Cited
U.S. PATENT DOCUMENTS
2006/0083987 A1    4/2006    Konishiike et al.
2006/0099507 A1    5/2006    Kogetsu et al.

FOREIGN PATENT DOCUMENTS

| JP | 06-325765 | 11/1994 |
|---|---|---|
| JP | 2002-083594 | 3/2002 |
| JP | 2002-358954 | 12/2002 |
| JP | 2004-047404 | 2/2004 |
| JP | 2004-349162 A | 12/2004 |
| KR | 10-2003-0033913 | 5/2003 |
| KR | 10-2005-0055294 | 6/2005 |
| KR | 10-2006-0052584 | 5/2006 |
| KR | 10-2006-0054047 | 5/2006 |

OTHER PUBLICATIONS

Machine Translation of JP 2004-349162, published Dec. 19, 2004.*
Definition of "Discontinuous" retrieved Feb. 6, 2010.*
Korean Notice of Allowance issued in corresponding Korean Patent Application No. 10-2005-0123846, dated on Oct. 12, 2007.
Korean Office Action, with English Translation issued in Korean Patent Application No. KR 10-2007-0092552, issued on Feb. 21, 2008.

* cited by examiner

*Primary Examiner*—Robert Hodge
(74) *Attorney, Agent, or Firm*—McDermott Will & Emery LLP

(57) ABSTRACT

A negative electrode for a lithium ion secondary battery including a current collector and an active material layer carried on the current collector, wherein the active material layer includes a first layer and a second layer alternately laminated in a thickness direction of the active material layer, and wherein the first layer includes silicon or silicon and a small amount of oxygen and the second layer includes silicon and a larger amount of oxygen than the first layer. With the use of the negative electrode, it is possible to provide a high capacity lithium ion secondary battery having excellent high rate charge/discharge characteristics and superior cycle characteristics.

5 Claims, 6 Drawing Sheets

F I G. 7
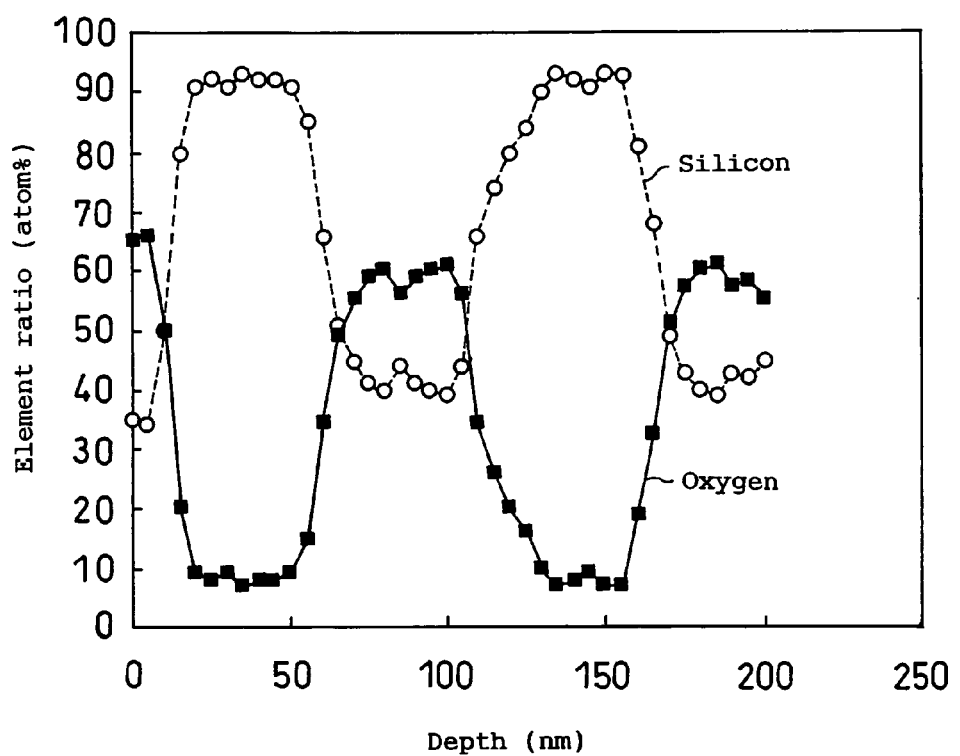

NEGATIVE ELECTRODE FOR LITHIUM ION SECONDARY BATTERY, PRODUCTION METHOD THEREOF AND LITHIUM ION SECONDARY BATTERY COMPRISING THE SAME

FIELD OF THE INVENTION

The present invention relates to a lithium ion secondary battery, and more particularly to a negative electrode therefor and a method for producing the negative electrode.

BACKGROUND OF THE INVENTION

Attention has been given to lithium ion secondary batteries as a power source for driving electronic equipment. Negative electrodes for lithium ion secondary batteries comprising a graphite material have an average potential during the desorption of lithium ions of about 0.2 V (vs. Li/Li$^+$) and exhibit a relatively flat potential. This potential is lower than that of negative electrodes comprising hard carbon, and therefore equipment that requires high voltage and voltage flatness currently employs, as the power source, lithium ion secondary batteries comprising negative electrodes including a graphite material. Graphite materials, however, have a small capacity per unit weight of 372 mAh/g, and a further increase in capacity cannot be expected.

Meanwhile, materials capable of forming an intermetallic compound with lithium are considered promising as negative electrode materials which provide a high capacity. Such materials include silicon, tin and oxides thereof. During the absorption of lithium ions, however, the crystal structure of these materials changes so that the volume of the materials increases. In the case of a negative electrode including an active material consisted of Si, the negative electrode active material is represented by $Li_{4.4}Si$ in the state where the maximum amount of lithium ions is absorbed. When Si changes into $Li_{4.4}Si$, the volume increases by 4.12 times. In the case of graphite, on the other hand, even if the maximum amount of lithium ions is absorbed, its volume increases only by 1.2 times.

A large volume change of active material results in cracking of active material particles, insufficient contact between active material and current collector, etc, which shortens charge/discharge cycle life. Particularly when cracking of active material particles occurs, the surface area of the active material particles increases, and the reaction between the active material particles and a non-aqueous electrolyte is accelerated. As a result, a film made of decomposition product of the electrolyte is likely to be formed on the surface of the active material. The formation of such film increases the interface resistance between the active material and the electrolyte, which is considered as a major cause for short charge/discharge cycle life.

In order to prevent the deterioration of charge/discharge cycle life, for example, Japanese Laid-Open Patent Publication No. 2002-83594 discloses to form an amorphous silicon thin-film on a current collector having a rough surface so as to create space for relieving the expansion stress, thereby ensuring current collecting efficiency. In order to increase the adhesion strength between the copper current collector and the thin-film, the above-mentioned patent publication (Japanese Laid-Open Patent Publication No. 2002-83594) proposes a method for forming a silicon-copper composite layer by forming an amorphous silicon thin-film on the current collector, followed by heat treatment.

In order to prevent an active material from cracking, for example, Japanese Patent Publication No. 2997741 teaches the use of a negative electrode active material composed of $SiO_x$ (0<x<2) having a low expansion coefficient during charge.

In order to improve battery capacity by the reduction of irreversible capacity and to improve cycle characteristics by ensuring conductivity of active material particles, for example, Japanese Laid-Open Patent Publication No. 2004-047404 teaches the use of a negative electrode active material composed of a silicon composite made of silicon oxide particles having silicon fine particles dispersed therein and carbon covering the silicon oxide particles.

In order to enhance charge/discharge efficiency, for example, Japanese Patent Publication No. 3520921 teaches a negative electrode having a multilayered structure composed of a carbon layer and a silicon oxide thin-film layer.

However, the negative electrodes disclosed in the above-mentioned prior art references suffer from various problems. For example, the present inventors examined the negative electrode disclosed by Japanese Laid-Open Patent Publication No. 2002-83594 only to find that lithium ion conductivity in the silicon was low, and that polarization increased when charge/discharge was performed at a high current value (i.e., high-load charge/discharge or high rate charge/discharge), resulting in a low discharge capacity. In a silicon thin film, in particular, a large concentration gradient of lithium is produced in the thickness direction, and the capacity decreases easily. Further, because silicon has an extremely large expansion coefficient, a negative electrode comprising silicon is highly deformed so that the electrode group having positive and negative electrodes disposed opposite to each other is buckled.

In order to overcome the above problems, the expansion stress at the interface between silicon and a current collector must be relieved. However, this requires considerable costs because additional steps are necessary such as a step of forming silicon into a columnar structure or a step of performing heat treatment for diffusing copper in the silicon.

As for the negative electrode disclosed by Japanese Patent Publication No. 2997741, because the active material layer is composed of a single-phase $SiO_x$, the conductivity thereof is low. In this case, the capacity density becomes low because the addition of a conductive material such as carbon to the active material layer is necessary. Also, because the irreversible capacity is large, the capacity of the negative electrode is smaller than that of the positive electrode so that the battery capacity becomes significantly low. From these reasons, the negative electrode of Japanese Patent Publication No. 2997741 fails to take advantage of the characteristics of high-capacity silicon and to provide a capacity as expected.

A further problem arises when the negative electrode contains a carbon material as a conductive material: propylene carbonate cannot be used as a solvent for electrolyte, because propylene carbonate is decomposed on the surface of the carbon material.

As for the negative electrode disclosed by Japanese Laid-Open Patent Publication No. 2004-047404, because $SiO_x$ is heat-treated to prepare silicon microcrystallites, it is difficult to control the size of the microcrystallites. When the microcrystallites have a size exceeding a certain size, cracking occurs during the expansion. In this method, because silicon crystals are inherently produced, it is impossible to form amorphous silicon which is advantageous for absorption and desorption of Li. Besides, such microcrystalline silicon is produced spot-wise, and they are surrounded by $SiO_x$ having low conductivity, which leads to a low high rate charge/ discharge capacity. Also, because Japanese Laid-Open Patent Publication No. 2004-047404 requires the use of a carbon material, propylene carbonate cannot be used as a solvent for electrolyte, as is the case in Japanese Patent Publication No. 2997741.

Moreover, the negative electrodes disclosed by Japanese Patent Publication No. 2997741 and Japanese Laid-Open Patent Publication No. 2004-047404 are produced by mixing the negative electrode active material, a conventional conductive material and a conventional binder to form a mixture which is then applied to a metal foil. In this case, because the active material particles and the current collector layer are bonded by the binder, the following problem arises: due to the large volume change of the active material during charge/discharge cycles as stated earlier, the conductive material and the binder cannot adjust to the volume change so that during repeated charge/discharge cycles, the contact between the active material and the conductive material as well as that between the active material and the binder cannot be maintained. As a result, the contact between the active material and the current collector is weakened, and the polarization increases, resulting in a low charge/discharge capacity.

The negative electrode disclosed by Japanese Patent Publication No. 3520921 contains, as the negative electrode active material, silicon oxide in which the molar ratio of oxygen relative to silicon is 0 to 2. In a thin film layer made of the silicon oxide, the oxygen ratio is uniform in any portion of the layer. When the silicon oxide has a high oxygen ratio, although the expansion coefficient is small during charge and an excellent lithium ion conductivity is obtained, the charge/discharge capacity is small. Conversely, when the silicon oxide has a low oxygen ratio, although the charge/discharge capacity is large, the expansion coefficient during charge is large, and the lithium ion conductivity is low.

When producing a negative electrode active material layer by vapor deposition method or sputtering method with the use of SiO as the target, Si—O bonds formed from the oxide of divalent silicon exist in the resulting thin-film. When such bonds react with lithium, oxygen is easily reduced and reacts with other lithium. This increases irreversible capacity, resulting in a low battery capacity.

Moreover, because the silicon oxide thin-film layer is in contact with a carbon layer, the carbon layer and the silicon oxide thin-film layer are separated from each other due to expansion stress during charge, resulting in low current collecting efficiency. Further, since the production of the carbon layer and the silicon oxide layer requires a completely different production process, the costs for producing negative electrodes will be very high, and negative electrodes cannot be produced efficiently.

In view of the foregoing, an object of the present invention is to provide a negative electrode for a lithium ion secondary battery having high capacity, superior high rate charge/discharge characteristics and excellent cycle characteristics, and a lithium ion secondary battery comprising the negative electrode.

BRIEF SUMMARY OF THE INVENTION

The present invention relates to a negative electrode for a lithium ion secondary battery comprising a current collector and an active material layer carried on the current collector, wherein the active material layer comprises a first layer and a second layer alternately laminated in a thickness direction of the active material layer, and wherein the first layer comprises silicon or silicon and a small amount of oxygen and the second layer comprises silicon and a larger amount of oxygen than the first layer.

In the negative electrode for a lithium ion secondary battery, preferably, the first layer has a thickness Ta of 5 nm to 1 μm and the second layer has a thickness Tb of 5 nm to 1 μm.

In the negative electrode for a lithium ion secondary battery, the first layer preferably comprises an active material represented by $SiO_x$ ($0 \leq x < 1$).

In the negative electrode for a lithium ion secondary battery, the second layer preferably comprises an active material represented by $SiO_y$ ($1 \leq y \leq 2$).

In the negative electrode for a lithium ion secondary battery, the active material layer preferably has a thickness T of 0.5 μm to 30 μm.

In the negative electrode for a lithium ion secondary battery, preferably, at least one of the first layer and the second layer is a non-continuous layer having a defect portion, and the defect portion is occupied by the other layer.

The negative electrode active material layer included in the negative electrode for a lithium ion secondary battery of the present invention may be in the form of a sheet. The negative electrode active material layer may have a roughened surface. FIG. 10 is an electron microscope image of a vertical cross section of a negative electrode whose active material layer has a roughened surface. As can be seen from the image of FIG. 10, the surface of a current collector 101 is roughened in order to prevent an active material layer 102 from separating from the current collector 101. In this case, the surface of the active material layer 102 is roughened, and accordingly is not flat.

In the negative electrode for a lithium ion secondary battery of the present invention, a plurality of columnar negative electrode active material layers may be formed on the current collector. The columnar active material layers may be formed such that they project in a direction vertical to an average surface of the current collector. Alternatively, the columnar active material layers may be formed such that they project from the average surface at a certain angle. The columnar active material layers may be in contact with each other. The average surface of the current collector as used herein refers to a plane assuming that the roughened surface of the current collector is flat.

The present invention further relates to a method for producing a negative electrode for a lithium ion secondary battery comprising a step of supplying silicon atoms to a current collector by sputtering or vapor deposition using a silicon target through an area into which oxygen gas is intermittently introduced, to form an active material layer comprising a first layer comprising silicon or silicon and a small amount of oxygen and a second layer comprising silicon and a larger amount of oxygen than the first layer alternately laminated therein.

In the method for producing a negative electrode for a lithium ion secondary battery, the oxygen gas introduced intermittently is preferably converted to plasma.

The present invention further relates to a method for producing a negative electrode for a lithium ion secondary battery comprising a step of continuously evaporating a silicon target and a silicon oxide target by sputtering or vapor deposition to supply silicon atoms to a current collector and supply silicon atoms and oxygen atoms to the current collector, respectively, while alternately blocking the supply of the silicon atoms and the supply of the silicon atoms and the oxygen atoms to the current collector at certain time intervals, so that the supply of the silicon atoms to the current collector and the supply of the silicon atoms and the oxygen atoms to the current collector are alternated to form a first layer containing only silicon or silicon and a small amount of oxygen and a second layer containing silicon and a larger amount of oxygen than the first layer, respectively, the first and second layers being alternately laminated on the current collector.

The present invention further relates to a method for producing a negative electrode for a lithium ion secondary battery comprising a step of alternately evaporating a silicon target and a silicon oxide target by sputtering or vapor deposition at certain time intervals to alternately supply silicon atoms to a current collector from the silicon target and silicon atoms and oxygen atoms to the current collector from the silicon oxide target, thereby forming a first layer containing only silicon or silicon and a small amount of oxygen and a second layer containing silicon and a larger amount of oxygen than the first layer alternately laminated on the current collector.

The present invention further relates to a lithium ion secondary battery comprising a positive electrode, the above-described negative electrode, a separator disposed between the positive electrode and the negative electrode and an electrolyte.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 7 is a graph showing results obtained when a negative electrode 1 produced in EXAMPLE 1 is analyzed by Auger electron spectroscopy (AES).

DETAILED DESCRIPTION OF THE INVENTION

The present invention will be described below with reference to the accompanying drawings.

Figure 1:
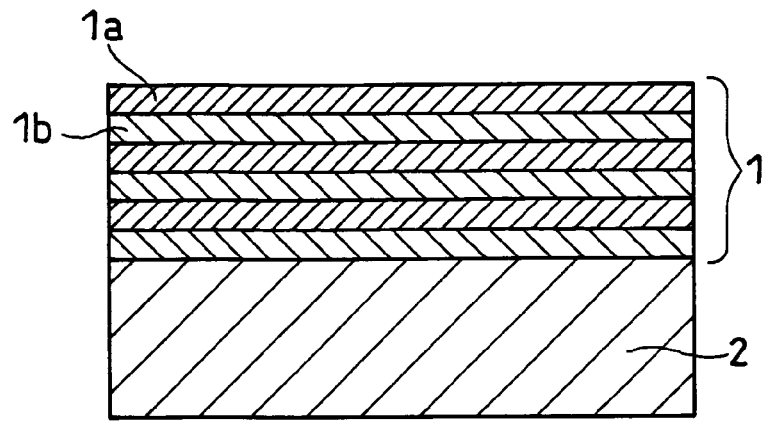
FIG. 1 is a schematic vertical sectional view of a negative electrode for a lithium ion secondary battery according to an embodiment of the present invention.

FIG. 1 is a vertical sectional view of a negative electrode for a lithium ion secondary battery according to one embodiment of the present invention.

A negative electrode of FIG. 1 comprises a current collector 2 and an active material layer 1 carried on the current collector 2. The current collector 2 is made of a metal foil. Examples of the metal foil include copper, nickel and stainless steel.

The active material layer 1 includes silicon (Si) and oxygen (O). More specifically, the active material layer 1 has first layers 1a with no or a low ratio of oxygen to silicon (hereinafter referred to as oxygen ratio) and second layers 1b having a higher oxygen ratio than the first layers 1a. The first layers 1a and the second layers 1b are alternately placed in the thickness direction of the active material layer 1. In FIG. 1, the first and second layers 1a and 1b are placed parallel to a length direction of the current collector.

The first layers 1a can be made of at least one selected from silicon and silicon oxide having a low oxygen ratio. The second layers 1b can be made of silicon oxide having a high oxygen ratio. In the active material layer, silicon, silicon oxide having a low oxygen ratio, and silicon oxide having a high oxygen ratio function as the active material. In each of the first and second layers 1a and 1b, the active material may be mixed in the form of atoms or particles.

The first layers 1a and the second layers 1b may contain a small amount of element other than silicon and oxygen such as nitrogen, phosphorus or boron. In this case, the amount of the element is preferably not greater than 0.1% by weight of the negative electrode active material layer.

A feature of the present invention is that the first layers 1a and the second layers 1b are alternately placed in a thickness direction of the active material.

The first layers 1a with no or a lower oxygen content have a high charge/discharge capacity and high electron conductivity, but the coefficient of the expansion caused by the reaction with lithium is large and its ion conductivity is low. As for the second layers 1b having a higher oxygen ratio than the first layers 1a, the coefficient of the expansion caused by the reaction with lithium is small, and its ion conductivity is high. However, its charge/discharge capacity and electron conductivity are low. Dense films of silicon dioxide ($SiO_2$) conventionally employed in semiconductor industry have an oxygen ratio (molar ratio) of about 2. Oxygen defect hardly occurs in the structure thereof, and its insulation capability is high. The second layers 1b, on the other hand, are produced through the reaction of silicon and oxygen at a high film-forming rate. For this reason, in the second layers 1b, oxygen defect is more likely to occur, and its electron conductivity is higher than dense films of silicon dioxide.

As described above, the first layers 1a and the second layers 1b have different advantages that the other layers do not have. As such, with the alternate lamination of the first layers 1a and the second layers 1b, it is possible to fully exert the advantages of both layers. More specifically, in an active material layer having the first layers 1a and the second layers 1b alternately laminated therein, the volume expansion coefficient of the active material is smaller than that of a monolayer made of silicon. Moreover, even when the active material expands upon the reaction with lithium ions during charge, the stress applied to the active material layer is dispersed in the entire active material layer, and thus the stress is relieved, whereby cycle characteristics can be improved.

Because the first layers 1a and the second layers 1b are alternately laminated, both high lithium ion conductivity and high electron conductivity can be achieved. Accordingly, high rate charge/discharge capacity can be achieved.

The reason why the mobility of lithium ions increases in the active material layer is not known now, but it can be explained as follows. The silicon oxide forming the active material layer has, inside thereof, a large number of paths in which lithium ions can migrate. Further, as the oxygen ratio of the silicon oxide increases, it becomes difficult for silicon and lithium to react with each other. In short, $Li_xSi$ and $Li_xSiO_y$ cannot be produced. For this reason, the mobility of lithium ions increases.

According to the present invention, high rate charge/discharge characteristics can be enhanced while high lithium ion conductivity and high electron conductivity are achieved by using a negative electrode having the active material layer as described above. Moreover, the expansion coefficient of the active material when it reacts with lithium ions can be reduced, and the stress resulting from the expansion can be dispersed in the entire active material layer. As a result, the stress is relieved, and cycle characteristics can be enhanced.

The first layers 1a preferably have a molar ratio x of oxygen to silicon of $0 \leq x < 1$. In other words, the active material contained in the first layers 1a is preferably $SiO_x$ ($0 \leq x < 1$). The second layers 1b preferably have a molar ratio y of oxygen to silicon of $1 \leq y \leq 2$. In other words, the active material contained in the second layers 1b is preferably $SiO_y$ ($1 \leq y \leq 2$). This is because the features described above are most pronounced when the oxygen ratios of the first layers 1a and the second layers 1b fall within in the above ranges. The properties of each layer (e.g., capacity, electron conductivity, ion conductivity and expansion coefficient) vary greatly from a molar ratio of oxygen of 1. For this reason, by adjusting the molar ratios of oxygen in the first layers 1a and the second layers 1b within the above ranges, an active material layer having an excellent balance of the above-mentioned properties can be obtained.

The first layers 1a preferably have a thickness Ta of 5 nm to 1 μm. When the thickness Ta is greater than 1 μm, the first layers 1a might crack or might be separated from the neighboring second layer(s) due to the expansion of the active materials, resulting in low cycle characteristics. Conversely, when the thickness Ta is less than 5 nm, the production of the first layers 1a becomes difficult, and the productivity might be reduced.

Similarly, the second layers 1b preferably have a thickness Tb of 5 nm to 1 μm. When the thickness Tb is greater than 1 μm, the capacity and the electron conductivity might be low. Conversely, when the thickness Tb is less than 5 nm, the production of the second layers 1b becomes difficult, and the productivity might be reduced as is the case in the first layers 1a.

The ratio of the thickness Tb of the second layer 1b to the thickness Ta of the first layer 1a (hereinafter referred to as Tb/Ta ratio) is preferably 1/10 to 10. Although it depends on the oxygen ratio of each layer, when the Tb/Ta ratio is less than 1/10, the first and second layers might be separated from each other due to the difference of the expansion coefficients of the active materials. When the Tb/Ta ratio is greater than 10, the electron conductivity or the capacity might become low.

The active material layer preferably has a thickness T of 0.5 μm $\leq$ T $\leq$ 30 μm. When the thickness of the active material layer is less than 0.5 μm, a sufficient battery capacity cannot be obtained. When the thickness of the active material layer is greater than 30 μm, the electrical resistance in a thickness direction of the active material layer becomes high, whereby the high rate charge/discharge capacity becomes low.

The active material layer preferably has at least one first layer 1a and at least one second layer 1b. It should be noted, however, that because the first and second layers have the limitation in thickness, the number of each layer should be adjusted according to the capacity per unit area of the electrode plate.

In the interface between the first layer 1a and the second layer 1b, the oxygen ratio may be varied gradually or rapidly. In either case, as long as the thicknesses of the first layer 1a and the second layer 1b fall within the above-mentioned range, the stress caused by the expansion of each layer is relieved sufficiently, and therefore the advantage of the present invention can be obtained. In the case where the active material layer comprises a first layer 1a made of silicon and a second layer 1b made of silicon oxide, the binding force between the first layer 1a and the second layer 1b will be satisfactory because silicon and silicon oxide have affinity for each other. In this case, the occurrence of separation of the first layer 1a and the second layer 1b from each other can be further reduced.

How the oxygen ratio of the interface between the first layer 1a and the second layer 1b varies depends on the production method of the active material layer.

Figure 2:
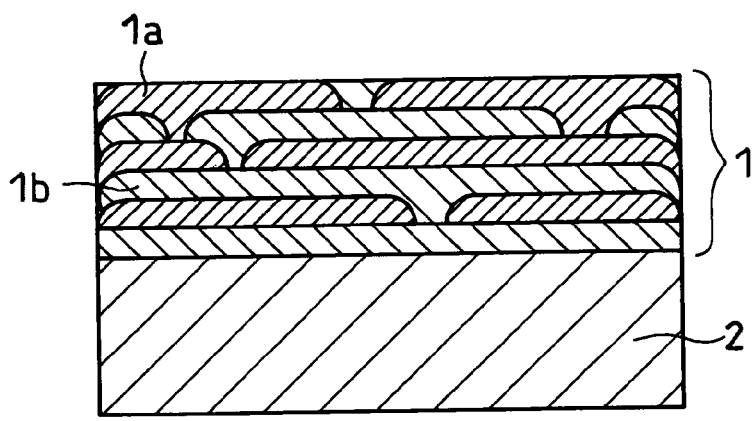
FIG. 2 is a schematic vertical sectional view of a negative electrode for a lithium ion secondary battery according to another embodiment of the present invention.

The first layers 1a and the second layers 1b positioned at a certain depth from the surface in the active material layer are not necessarily a layer occupying the entire area at a given depth in a width direction and/or a length direction of the active material layer, as shown in FIG. 2. In short, the first layers 1a and the second layers 1b may be a non-continuous layer partially having a defect portion. In this case, the maximum width of the defect portion is preferably not greater than 1 μm. The reason therefor is the same as that given when the maximum thicknesses of the first layer 1a and the second layer 1b were specified previously above.

In this case also, as long as the thicknesses of the first layer 1a and the second layer 1b fall within the previously-mentioned range, the advantages of the present invention are not impaired.

Figure 3:
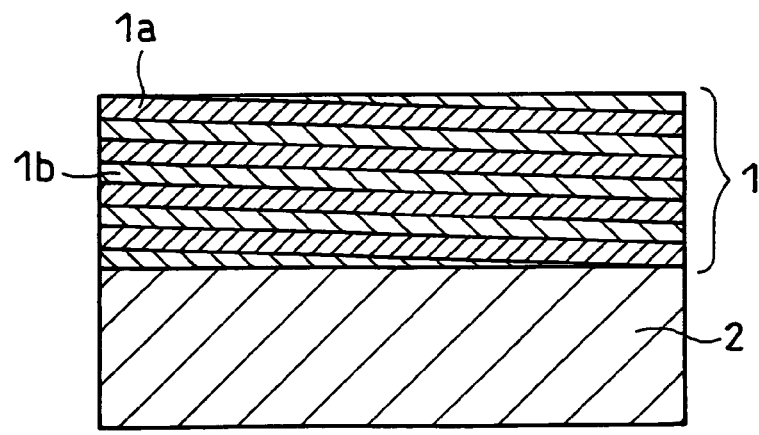
FIG. 3 is a schematic vertical sectional view of a negative electrode for a lithium ion secondary battery according to still another embodiment of the present invention.

FIG. 1 shows a case in which the first layers 1a and the second layers 1b are parallel to a length direction (and a width direction) of the current collector. As shown in FIG. 3, the first layers 1a and the second layers 1b may be tilted at a certain angle relative to a length direction and/or a width direction of the current collector. Even when the first and second layers are tilted, the advantages of the present invention can be obtained.

The negative electrode for a lithium ion secondary battery of the present invention does not require the inclusion of a carbon material. As such, propylene carbonate (PC), which is usually decomposed in the presence of a carbon material, can be used as a solvent for electrolyte in the present invention. Ethylene carbonate (EC), a typical solvent for electrolyte used for negative electrodes comprising graphite, has a high melting point. Accordingly, if the ratio of EC is high in the electrolyte, the resulting battery will have low charge/discharge characteristics in a low temperature environment. On the other hand, PC has a low melting point. Accordingly, the use thereof results in excellent low temperature characteristics compared to the use of EC. Because PC can be used as a solvent for electrolyte in a lithium ion secondary battery of the present invention, low temperature characteristics can be enhanced.

It is generally known that the adhesion strength of the active material layer to the current collector can be improved by roughening the surface of the current collector in a negative electrode containing silicon as an active material. This effect is also present in the present invention. For example, even when a thin film having a high internal stress is formed on a current collector having a surface roughness Ra of 0.1 μm to 1.3 μm at a high film-forming rate, the formed active material layer does not separate from the current collector, which means very high adhesion can be obtained. Further, even when a lithium ion secondary battery including such a negative electrode is subjected to repeated charge/discharge cycles, the active material layer does not separate from the current collector. Therefore, a high capacity can be maintained.

A method for producing a negative electrode for a lithium ion secondary battery of the present invention is now described with reference to the accompanying drawings.

Figure 4:
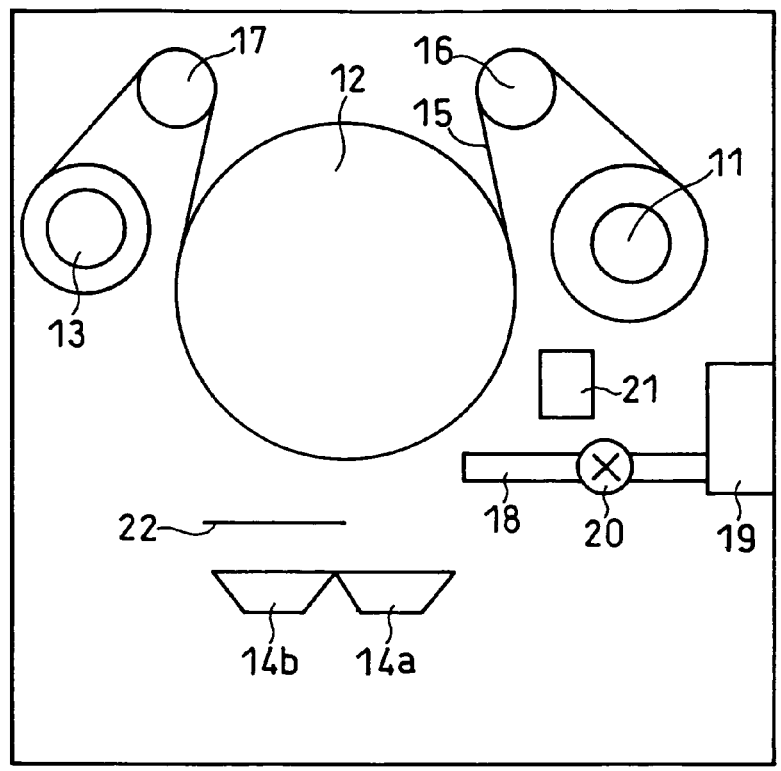
FIG. 4 is a schematic diagram of vapor deposition equipment used for producing a negative electrode for a lithium ion secondary battery of the present invention.
Figure 5:
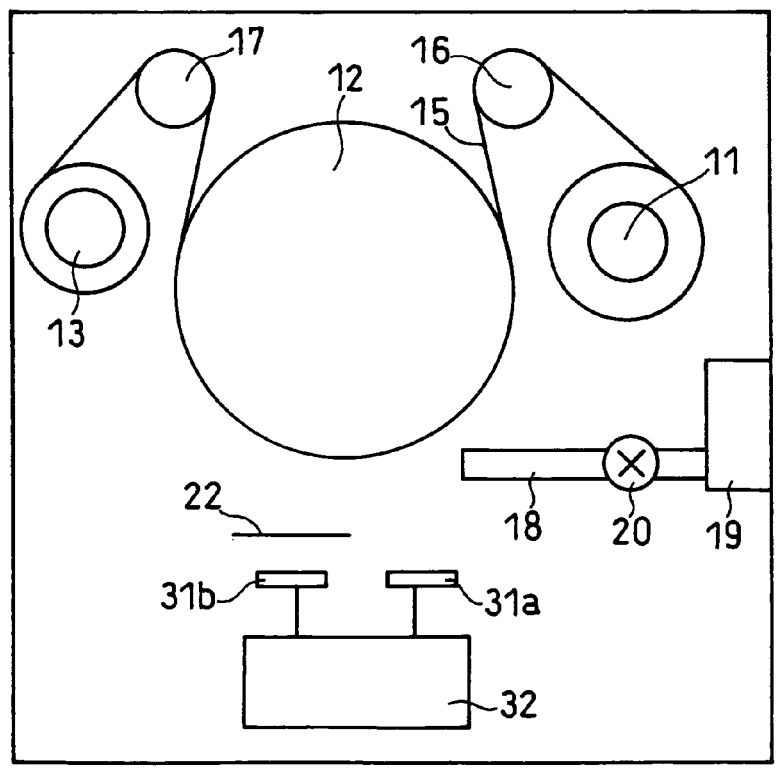
FIG. 5 is a schematic diagram of sputtering equipment used for producing a negative electrode for a lithium ion secondary battery of the present invention.

A negative electrode for a lithium ion secondary battery of the present invention can be produced by vapor deposition equipment as shown in FIG. 4 or sputtering equipment as shown in FIG. 5.

The vapor deposition equipment of FIG. 4 comprises a vacuum chamber (not shown in the drawing), and a means for moving a long current collector, a silicon target 14a, a silicon target 14b, and an oxygen nozzle 18 which are disposed in the vacuum chamber. The means for moving a long current collector includes a feeding roller 11, a can roller 12, a winding roller 13 and rollers 16 and 17. In the vapor deposition equipment shown in FIG. 4, a long current collector 15 is fed from the feeding roller 11 through the roller 16, the can roller 12 and another roller 17 to the winding roller 13. The targets are heated by an electron beam (EB) heater (not shown in the drawing) in the vapor deposition equipment of FIG. 4.

Using the vapor deposition equipment described above, the negative electrode for a lithium ion secondary battery of the present invention can be produced by the following methods.

Production Method 1

The silicon target(s) 14a and/or 14b are heated by the EB heater to allow silicon atoms forming the silicon target(s) to pass through an area to which oxygen gas is introduced intermittently so as to supply the silicon atoms onto the current collector. Thereby, it is possible to form an active material layer including first layers comprising silicon or silicon and a small amount of oxygen and second layers comprising silicon and a larger amount of oxygen alternately laminated in a thickness direction of the active material layer.

The oxygen gas is intermittently supplied from the oxygen nozzle 18 to the area between the target(s) and the current collector. Preferably, the oxygen gas is supplied such that the oxygen concentration is almost uniform in the area where the active material layer is formed (i.e., the area where the evaporated silicon atoms pass through). As such, the oxygen nozzle 18 may be placed anywhere as long as it can supply oxygen gas such that the oxygen concentration is uniform in the area where the active material layer is formed. In the present invention, the oxygen gas may further contain gas other than oxygen. The oxygen gas may be a mixed gas containing a small amount of other gas such as nitrogen or argon. Also, air may be used as the oxygen gas.

The flow rate of the oxygen gas, the oxygen gas supply time and the interval between the supply of the oxygen gas can be controlled by, for example, a mass flow controller 19 and/or a solenoid valve 20 arranged at the oxygen nozzle 18. The mass flow controller 19 and the solenoid valve 20 may be used simultaneously, or either one of them may be used singly. The mass flow controller 19 used generally, however, usually has a slow response time of about 1 second. Accordingly, the combined use of the mass flow controller 19 and the solenoid valve 20 is preferred when the valve is allowed to open and close every 10 seconds or less.

In this production method, the silicon atoms evaporated by the heater are oxidized only when the oxygen gas is supplied to the area between the target(s) and the current collector, and thus a second layer comprising silicon oxide having a higher oxygen ratio is formed on the current collector. During the interval of the supply of the oxygen gas (i.e., while the supply of the oxygen gas is stopped), the oxygen concentration of the area between the target(s) and the current collector rapidly decreases, and therefore a first layer comprising silicon oxide having a low oxygen ratio or a first layer comprising only silicon is formed on the current collector. Preferably, the oxygen gas supply with an interval is performed while the gas in the vacuum chamber is discharged by a vacuum pump. The pressure of the oxygen gas in the vacuum chamber is preferably $1 \times 10^{-6}$ to $5 \times 10^{-4}$ Torr while the oxygen gas is supplied. While the oxygen gas is not supplied, the pressure is preferably $1 \times 10^{-7}$ to $1 \times 10^{-4}$ Torr. It should be noted, however, that a preferred range of the pressure of the oxygen gas varies depending on the size of the vacuum chamber, the discharge rate of the vacuum pump, the position of pressure sensor in the vacuum chamber, the Si deposition rate, etc.

By intermittently supplying the oxygen gas to the area between the target(s) and the current collector in the manner described above, it is possible to alternately form first layers with no or a lower oxygen ratio and second layers having a higher oxygen ratio on the current collector 15.

The thicknesses of the first layer and the second layer can be controlled by, for example, the power of electron beam for evaporating the target(s), the supply amount of the oxygen gas and/or the moving rate of the current collector. The thickness ratio between the first layer and the second layer can be changed by changing the ratio between the supply time of the oxygen gas and the interval in which the oxygen gas is not supplied.

As discussed above, this method of producing the negative electrode of the present invention employs inexpensive silicon and intermittently introduces the oxygen gas so that the active material layer can be formed in one vacuum chamber. This enables highly efficient production of the negative electrode at low cost.

As shown in FIG. 4, a means 21 for converting the oxygen gas to plasma may be arranged near the oxygen nozzle 18. In this case, because the oxygen gas is converted to plasma, the reactivity with the evaporated silicon atoms can be enhanced. For this reason, even when the amount of the evaporated silicon atoms is increased by increasing the energy of the heater for evaporating the silicon target, the evaporated silicon atoms can be oxidized sufficiently by converting the oxygen gas to plasma. This increases the film-forming rate of the active material, leading to improved production efficiency.

The negative electrode for a lithium ion secondary battery of the present invention can be produced by other methods (PRODUCTION METHODs 2 and 3) than PRODUCTION METHOD 1 discussed above. Referring to FIG. 4, PRODUCTION METHODs 2 and 3 will be described below.

Production Method 2

This production method employs both a silicon target and a silicon oxide target (e.g., silicon dioxide target), and does not use the oxygen gas.

The vapor deposition equipment used in this production method as shown in FIG. 4 comprises a silicon target 14a, a silicon oxide target 14b, and a shutter 22 arranged between the target and the current collector. The silicon target 14a and the silicon oxide target 14b are evaporated simultaneously by a heater, during which the shutter 22 is alternately moved back and forth over the targets 14a and 14b such that the shutter 22 is held between the target 14a and the current collector for a certain length of time, then moved over the target 14*b* (i.e., between the target 14*b* and the current collector) and held there for another certain length of time, which is performed repeatedly. Thereby, first layers composed of silicon and second layers composed of silicon oxide are alternately laminated on the current collector.

More specifically, referring to FIG. 4, the shutter 22 is arranged between the silicon oxide target 14*b* and the current collector. The shutter 22 blocks the migration of the atoms forming the silicon oxide target. Accordingly, only the atoms forming the silicon target are deposited on the current collector.

In this production method, the thicknesses of the first layer and the second layer can be adjusted by adjusting the ratio of time for which the shutter 22 blocks the migration of the atoms forming each target. Alternately, the thicknesses of the first and second layers can be adjusted by adjusting the energy necessary for evaporating the target. Still alternately, the thicknesses of the first and second layers can be adjusted by simultaneously adjusting the ratio of time for which the shutter 22 blocks the migration of the atoms as well as the energy necessary for evaporating the target.

When forming a film using silicon oxide such as silicon dioxide by electron beam vapor deposition (EB vapor deposition), usually, a silicon oxide film having partial defect of oxygen is formed. The amount of oxygen defect increases as the film-forming rate is increased. At this time, the silicon in the silicon oxide film that is not bonded to oxygen reacts with lithium to form a thin film having electron conductivity and ion conductivity.

This production method does not involve a reaction between the atoms forming each target and the oxygen gas, and merely the atoms forming the targets are alternately allowed to deposit on the current collector. Accordingly, the thicknesses of the first and second layers can be controlled strictly. This can be applied to PRODUCTION METHOD 3 described below.

Production Method 3

Similar to PRODUCTION METHOD 2 described above, this production method does not employ the oxygen gas, and instead uses both a silicon target and a silicon oxide target (e.g., silicon dioxide target).

In this production method, the targets are alternately evaporated by a heater to supply the atoms forming the targets onto the current collector, whereby layers comprising atoms forming the targets (i.e., a layer comprising silicon and a layer comprising silicon oxide) are formed on the current collector.

In this method, by adjusting time for heating each target by a heater, the thicknesses of the layers and the ratio of the layers present in the active material layer can be readily adjusted.

According to this method, the difference of oxygen ratio between the resulting first layer and second layer is a little smaller than that of PRODUCTION METHOD 2 because, for example, even when the target to be heated by a heater is changed from the silicon target to the silicon oxide target, the silicon target is melted so that silicon is continuously vaporized.

For heating the targets, only one heater may be used, or heaters may be provided for each target. When a plurality of targets are used, from the viewpoint of operability and size reduction, the use of one heater is preferred. In this case, the targets should be heated separately.

Because the targets are heated separately in this method, in the vapor deposition equipment as shown in FIG. 4, the shutter 22 arranged between the target and the current collector is unnecessary.

In any of PRODUCTION METHODs 1 to 3 described above, the active material layer may be produced while the current collector is held at a standstill, or the active material layer may be produced while the current collector is continuously moved. When producing the active material layer while the current collector is held at a standstill, in the resulting active material layer, the first and second layers are parallel to a length direction of the current collector, as shown in FIG. 1. When producing the active material layer while the current collector is moved, in the resulting active material layer, the first and second layers are tilted at a certain angle relative to a length direction of the current collector, as shown in FIG. 3. This can be applied to the case of producing the active material layer using sputtering equipment, which will be described below.

Since PRODUCTION METHODs 2 and 3 employ a silicon target and a silicon oxide target (e.g., silicon dioxide target), the Si—O bonds (silicon valence: 2) are extremely small in number, and Si—Si bonds and O—Si—O bonds (silicon valence: 4) are dominant in the formed layers. For this reason, the irreversible capacity can be reduced.

While, in the above, PRODUCTION METHODs 1 to 3 have been described in the case of using vapor deposition equipment, the negative electrode of the present invention can be produced similarly using sputtering equipment.

FIG. 5 shows an example of sputtering equipment. In FIG. 5, the same reference numbers are given to the same components of FIG. 4, and the descriptions of the same components are omitted here. Similar to the vapor deposition equipment of FIG. 4, the formation of the active material layer onto the current collector is performed in a vacuum chamber (not shown in the drawing).

In the sputtering equipment of FIG. 5, sputtering gas (e.g., argon gas) is converted to plasma by a high frequency power supply 32 to evaporate silicon targets 31*a* and 31*b*. The evaporated silicon atoms migrate to the current collector, during which the oxygen gas is intermittently introduced from an oxygen nozzle 18 to the area between the targets and the current collector with the aid of a mass flow controller 19 and/or a solenoid valve 20. Thereby, first layers with no or a lower oxygen ratio and second layers having a higher oxygen ratio are alternately formed on the current collector.

The thicknesses of the first and second layers can be controlled by adjusting the power of the high frequency power supply 32, the amount of oxygen gas supplied to the area between the targets and the current collector, the moving rate of the current collector, etc. The thickness ratio between the first layer and the second layer can be controlled by adjusting the ratio of the oxygen gas supply time to the interval between the supply of the oxygen gas.

When producing the active material layer according to PRODUCTION METHOD 2 or 3 using sputtering equipment, the production is carried out in essentially the same manner as the case of using vapor deposition equipment.

More specifically, in the case of PRODUCTION METHOD 2 using sputtering equipment as shown in FIG. 5, a silicon target 31*a* and a silicon oxide target 31*b* are used. A shutter 22 is arranged between the target and the current collector. By moving the shutter 22 back and forth over the silicon target 31*a* and the silicon oxide target 31*b* such that the shutter 22 is held between the silicon target 31*a* and the current collector for a certain length of time, then moved over the silicon oxide target 31*b* (i.e., between the target 31*b* and the current collector) and held there for another certain length of time, which is performed repeatedly, the first layers and the second layers are alternately laminated. The thicknesses of the first and second layers can be adjusted in the same manner as the case of using vapor deposition equipment.

As for the case of PRODUCTION METHOD 3 using sputtering equipment as shown in FIG. 5, similar to the case of using vapor deposition equipment, a silicon target 31a and a silicon oxide target 31b are evaporated by a heater alternately and separately. Thereby, layers composed of atoms forming the targets (i.e., a layer comprising silicon and a layer comprising silicon oxide) are alternately formed onto the current collector. In this method, similar to the case of using vapor deposition equipment, the shutter 22 arranged between the target and the current collector is unnecessary.

In the case of the above-described PRODUCTION METHOD 1, the oxygen ratio gradually varies at the interface between the first layer and the second layer. In the case of PRODUCTION METHODs 2 and 3, on the other hand, the oxygen ratio varies rapidly at the interface between the first layer and the second layer.

As described above, in any of the above PRODUCTION METHODs, as long as the thickness of each layer falls within the range given previously, the stress caused by the expansion of each layer is relived sufficiently, and therefore the effect of the present invention can be obtained.

The present invention will be described below by way of examples.

Example 1

Battery 1

(i) Production of Positive Electrode

With 100 parts by weight of lithium cobalt oxide ($LiCoO_2$) having an average particle size of 10 μm was mixed 3 parts by weigh of acetylene black as a conductive material to prepare a mixture. The resulting mixture was mixed with a N-methyl-2-pyrrolidone (NMP) solution of polyvinylidene fluoride (PVDF) as a binder such that 4 parts by weight of PVDF was added to the mixture, followed by kneading to prepare a positive electrode material mixture paste. The obtained positive electrode material mixture paste was applied onto both surfaces of a current collector sheet made of an aluminum foil, followed by drying and rolling to produce a positive electrode.

(ii) Production of Negative Electrode

The process for producing a negative electrode will be described later below.

(iii) Production of Battery

Figure 6:
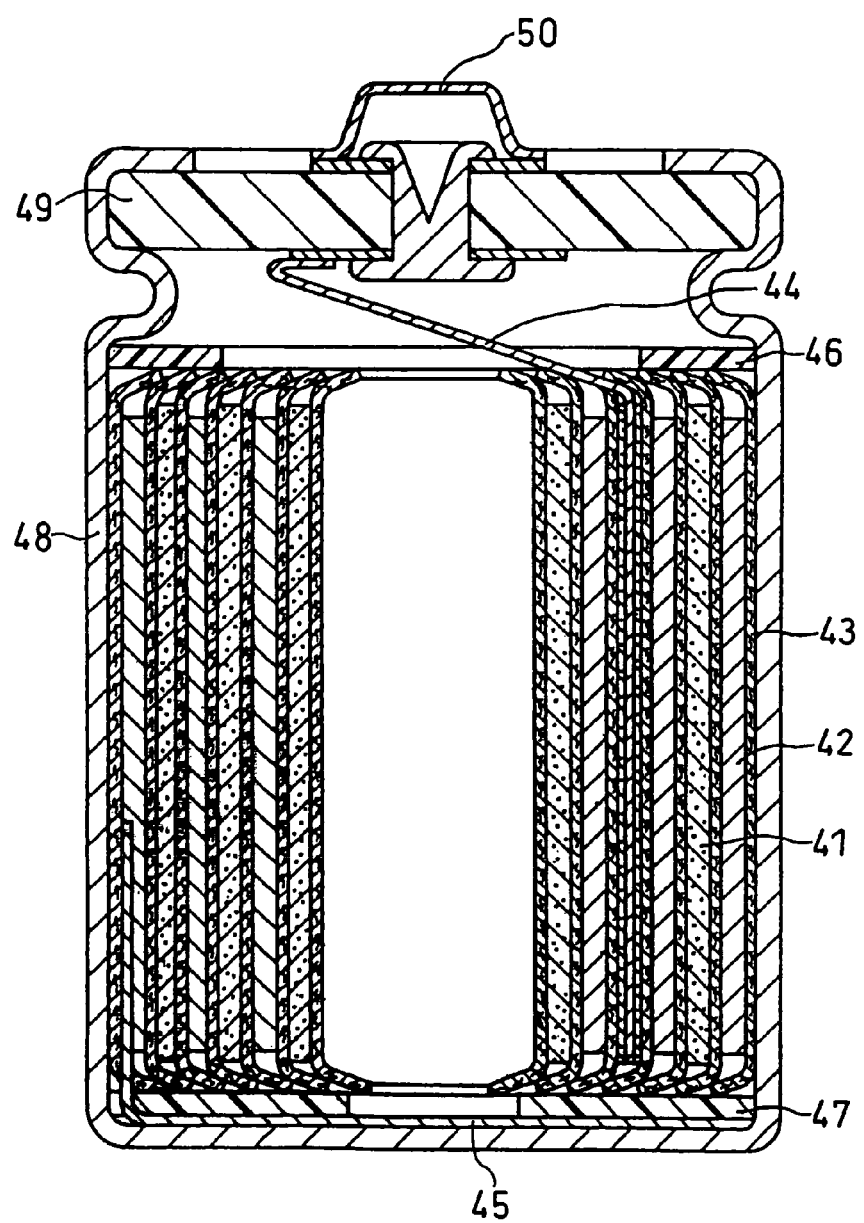
FIG. 6 is a schematic vertical sectional view of a cylindrical battery produced in EXAMPLEs.

A 17500-type cylindrical battery as shown in FIG. 6 was produced using the above-produced positive electrode and negative electrode. The positive electrode 41 and the negative electrode 42 were spirally wound with a separator 43 interposed therebetween to produce an electrode assembly. The electrode assembly was housed in an iron battery case 48 plated with nickel. One end of an aluminum positive electrode lead 44 was connected to the positive electrode 41. The other end of the positive electrode lead 44 was connected to a positive electrode terminal 50, which was attached to a conductive member arranged in the center of a resin sealing plate 49, by connecting the other end of the positive electrode lead 44 to the underside of the conductive member. One end of a nickel negative electrode lead 45 was connected to the negative electrode 42. The other end of the nickel negative electrode lead 45 was connected to the bottom of the battery case 48. On the upper part of the electrode assembly was placed an upper insulating plate 46. On the lower part of the same was placed a lower insulating plate 47.

Subsequently, a predetermined amount of electrolyte was injected into the battery case 48. The electrolyte was prepared by dissolving $LiPF_6$ in a solvent mixture of ethylene carbonate (EC) and ethyl methyl carbonate (EMC) at a volume ratio of 1:3 at a $LiPF_6$ concentration of 1 mol/L.

Finally, the opening of the battery case 48 was sealed with the sealing plate 49. Thereby, a battery was produced.

A process for producing a negative electrode is now described here. For producing a negative electrode, vapor deposition equipment as shown in FIG. 4 was used. The vapor deposition equipment included: a vapor deposition apparatus (available from ULVAC, Inc.) equipped with an EB heater (not shown in the drawing), a means for moving a current collector including a feeding roller, can roller, a winding roller and rollers, and the like.

A negative electrode was produced essentially as described previously.

As the negative electrode current collector, an electrolytic copper foil (available from Furukawa Circuit Foil Co., Ltd.) having a width of 10 cm, a thickness of 35 μm and a length of 50 m was used.

The copper foil serving as the current collector was fed from a feeding roller 11 through the outer surface of a can roller 12 to a winding roller 13 having an empty reel where the copper foil was wound. The copper foil was moved at a rate of 2 cm/min.

As the oxygen gas, oxygen gas having a purity of 99.7% (available from Nippon Sanso Corporation) was used. An oxygen nozzle 18 equipped with a solenoid valve 20 was connected to a mass flow controller 19. The oxygen gas was introduced into the area between the current collector and the targets intermittently by adjusting the solenoid valve 20 to open and close every 3 seconds (i.e., valve opening time: 3 seconds, valve closure time: 3 seconds) while the gas in the vacuum chamber was discharged by a vacuum pump. The flow rate of the oxygen gas was set at 50 sccm. In the vapor deposition equipment used in this example, the pressure in the vacuum chamber while the oxygen gas was introduced was $2.0 \times 10^{-4}$ Torr. The pressure in the vacuum chamber while the oxygen gas was not introduced was $8.0 \times 10^{-5}$ Torr.

As targets 14a and 14b, single silicon crystals having a purity of 99.9999% (available from Shin-Etsu Chemical Co., Ltd.) were used.

The accelerating voltage of the electron beam irradiated to the targets 14a and 14b of single silicon crystals was set at −8 kV. The emission of the electron beam was set at 300 mA.

The silicon targets were evaporated by an EB heater and allowed to pass through the oxygen gas introduced intermittently so as to supply them onto the copper foil current collector. Thereby, an active material layer in which first layers comprising silicon or silicon and a small amount of oxygen and second layers comprising silicon and a larger amount of oxygen than the first layer were alternately laminated was formed on the copper foil.

After the formation of the active material layer on one surface of the current collector, another active material layer was also formed on the other surface of the current collector in the same manner as above. Each active material layer had a thickness of 7.0 μm.

Finally, the obtained electrode plate was cut into a predetermined size to produce a negative electrode. The thus-produced negative electrode was denoted as negative electrode 1.

The surface of the negative electrode 1 was analyzed by Auger electron spectroscopy (AES). The results are shown in FIG. 7.

As can be seen from FIG. 7, the amounts of oxygen and silicon are alternately increased and decreased. This indicates that the layers having a low oxygen ratio (first layers) and the layers having a higher oxygen ratio (second layers) were alternately laminated. FIG. 7 also indicates that the first and second layers each had a thickness of about 50 nm. In FIG. 7, the oxygen ratio was higher in the surface of the active material layer not in contact with the current collector. Presumably, this is because the negative electrode reacted with oxygen in the air when the negative electrode was removed from the vacuum chamber, and an oxide film was formed on the surface of the negative electrode.

Figure 8:
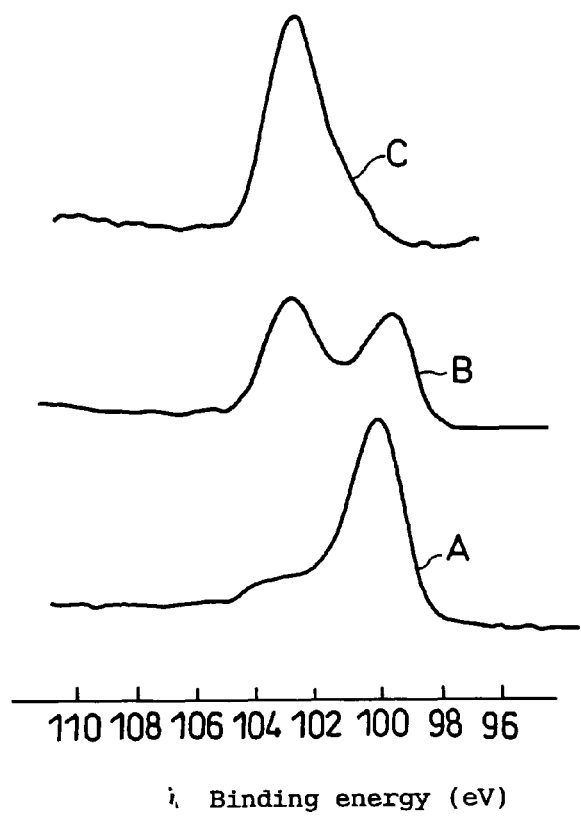
FIG. 8 is a graph showing results obtained when a negative electrode 1 produced in EXAMPLE 1 is analyzed by X-ray photoelectron spectroscopy (XPS).

The negative electrode 1 was analyzed also by X-ray photoelectron spectroscopy (XPS). The results are shown in FIG. 8.

In the first layer (A), a peak of Si was observed at around 100 eV. In the second layer (C), a peak of $SiO_x$ (x being about 1.9) was observed at around 104 eV. In the middle range from the first layer to the second layer (B), two peaks of Si and $SiO_x$ were dominantly observed, and a peak of SiO that usually appears at around 102 eV was not observed. This suggests that Si and $SiO_x$ were dominant with little SiO in the active material layer and that Si and $SiO_x$ were mixed in the active material layer.

Figure 9:
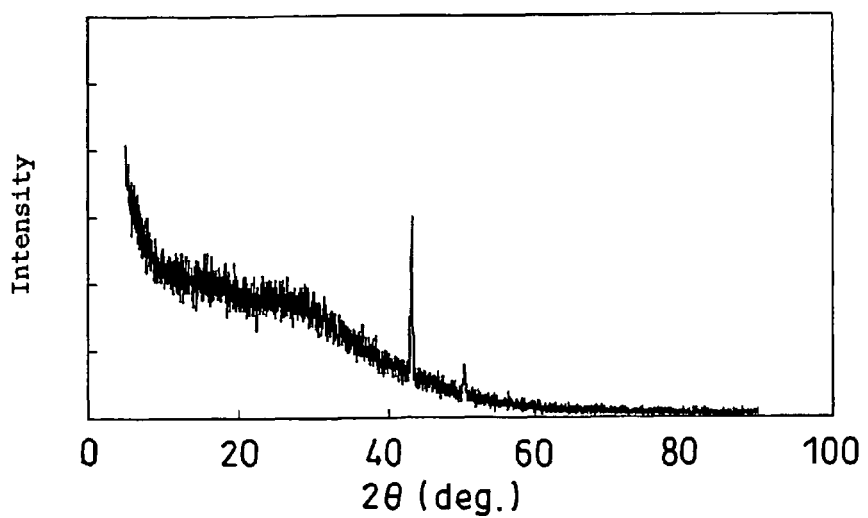
FIG. 9 is a graph showing results obtained when a negative electrode 1 produced in EXAMPLE 1 is analyzed by X-ray diffractometry (XRD).
Figure 10:
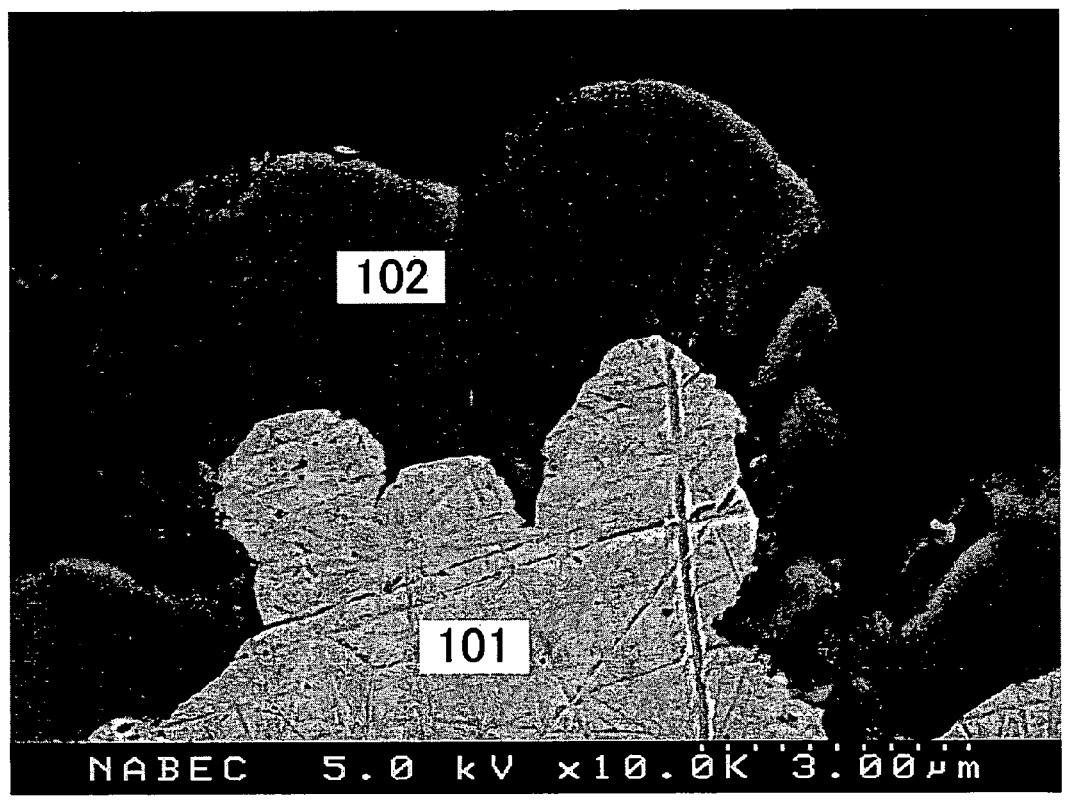
FIG. 10 is an electron microscope image of a vertical cross section of a negative electrode for a lithium ion secondary battery according to an embodiment of the present invention.

The negative electrode 1 was analyzed also by X-ray diffractometry (XRD). The results are shown in FIG. 9.

As a result of identification, only copper was detected. In the obtained chart, a broad halo was observed at a $2\theta$ angle of 10° to 35°. This broad halo is considered to show that the active material contained in the active material layer including silicon and oxygen was amorphous.

From the foregoing analysis results, it was confirmed that the first layers and the second layers were alternately formed in the active material layer of the negative electrode 1, and that the first and second layers were both amorphous.

(Comparative Battery 1)

For comparison, a battery was produced in the same manner as the battery 1 was produced except that, in the production of the negative electrode, a silicon thin film was formed on each surface of the current collector without introducing the oxygen gas into the vacuum chamber. The produced battery was denoted as comparative battery 1.

(Comparative Battery 2)

A negative electrode was formed in the same manner as the negative electrode 1 was produced except that, without introducing the oxygen gas into the vacuum chamber, an SiO thin film was formed on each surface of the current collector under the following conditions:

target: sintered SiO (available from Sumitomo Titanium Corporation);

accelerating voltage of electron beam: −8 kV; and emission of electron beam: 30 mA.

In the production of the negative electrode, care was taken to ensure that the electron beam was not focused on a specific spot of the SiO target because SiO easily sublimes.

Using the thus-obtained negative electrode, a battery was produced in the same manner as the battery 1 was produced. The produced battery was denoted as comparative battery 2.

The negative electrode active material layers of the comparative batteries 1 and 2 were also subjected to Auger electron spectroscopy (AES). As a result, it was confirmed that, in each active material layer, the composition was uniform.

(Evaluation Method)

The battery 1 and the comparative batteries 1 and 2 produced above were each charged at a constant current of 40 mA until the battery voltage reached 4.2 V at an ambient temperature of 25° C. After an interval of 20 minutes, the battery was then discharged at a constant current of 40 mA until the battery voltage decreased to 2.5 V. This charge/discharge cycle was repeated twice. The discharge capacity obtained at the second cycle was denoted as initial capacity. The rate of discharge capacity at the first cycle to the charge capacity at the first cycle expressed in percentage was denoted as charge/discharge efficiency.

High rate discharge capacity was determined as follows.

Each battery was charged at a constant current of 40 mA until the battery voltage reached 4.2 V at an ambient temperature of 25° C. After an interval of 20 minutes, the battery was then discharged at a constant current of 400 mA until the battery voltage decreased to 2.5 V, during which the discharge capacity was measured. The rate of the obtained discharge capacity to the initial capacity expressed in percentage was denoted as high rate capacity ratio.

In order to evaluate cycle characteristics, capacity retention rate was determined.

Each battery was subjected to 100 charge/discharge cycles in each of which charging was performed at a constant current of 40 mA until the battery voltage reached 4.2 V at an ambient temperature of 25° C., after an interval of 20 minutes, discharging was then performed at a constant current of 40 mA until the battery voltage decreased to 2.5 V. The rate of the discharge capacity obtained at the 100th cycle to the initial capacity expressed in percentage was denoted as capacity retention rate.

The results are shown in Table 1.

TABLE 1

| | Initial capacity (mAh) | Charge/discharge efficiency (%) | High rate capacity ratio (%) | Capacity retention rate (%) |
|---|---|---|---|---|
| Battery 1 | 240 | 85 | 95 | 92 |
| Comp. Battery 1 | 273 | 90 | 70 | 55 |
| Comp. Battery 2 | 160 | 40 | 80 | 89 |

As can be seen from Table 1, the battery 1 exhibited relatively high initial capacity and high charge/discharge efficiency as well as excellent high rate capacity ratio. The comparative battery 1, on the other hand, exhibited high charge/discharge efficiency and high initial capacity, but its high rate capacity ratio and capacity retention rate were much lower than those of the battery 1. As for the comparative battery 2, it exhibited lower levels in all four evaluation tests (i.e., initial capacity, charge/discharge efficiency, high rate capacity ratio and capacity retention rate) than the battery 1.

In the active material layer of the battery 1, the second layer composed of silicon oxide with high lithium ion conductivity and a high oxygen ratio was sandwiched by the first layers composed of silicon or silicon oxide with high electron conductivity and a lower oxygen ratio. Presumably, this structure allows a smooth transportation of lithium ions, and thus excellent high rate capacity ratio was achieved. The comparative battery 2 whose active material was composed of SiO, on the other hand, exhibited higher lithium ion conductivity than the comparative battery 1 whose active material was composed of silicon. However, the active material layer of the comparative battery 2 had a uniform composition therethroughout, and therefore its electron conductivity was lower. For this reason, the comparative battery 2 exhibited a lower high rate capacity ratio than the comparative battery 1.

In the case of a battery composed of only silicon (i.e., comparative battery 1), it is generally known that the cycle characteristics (capacity retention rate) can be enhanced by forming silicon serving as the negative electrode active material into a columnar shape to provide space for the expansion. However, in the battery 1, improved cycle characteristics could be obtained without forming the active material into a columnar shape. Accordingly, such formation of the active material is unnecessary for producing the battery 1. Because the layers having a high expansion coefficient and the layers having a low expansion coefficient were alternately laminated in the battery 1, the expansion stress was relieved by this structure.

As for the comparative battery 2, the charge/discharge efficiency was extremely low, and thus the initial capacity was also small. The reason for such low charge/discharge efficiency is presumably because a side reaction occurred in which the oxygen of SiO bonded to lithium. As can be seen from the XPS result, in the active material layer of the battery 1, even when the oxygen ratio was changed, a peak of SiO was not observed, and only peaks of Si and $SiO_x$ (having a composition similar to $SiO_2$) changed. This suggests that, microscopically speaking, Si and $SiO_x$ were present in a mixed state in the active material layer of the battery 1. Si has high charge/discharge efficiency, and $SiO_x$ does not react with silicon. For this reason, the active material layer of the battery 1 having the first layers and the second layers alternately laminated therein exhibited high charge/discharge efficiency.

Example 2

In this example, comparisons were made between batteries having a propylene carbonate (PC)-containing electrolyte and batteries having a non-PC-containing electrolyte in terms of initial capacity, charge/discharge efficiency and discharge capacity ratio at −10° C.

Batteries 2 and 3

Two different electrolytes were prepared: an electrolyte prepared by dissolving $LiPF_6$ in a solvent mixture of propylene carbonate (PC) and dimethyl carbonate (DMC) at a volume ratio of 6:4 at a $LiPF_6$ concentration of 1 mol/L; and another electrolyte prepared by dissolving $LiPF_6$ in a solvent mixture of EC and DMC at a volume ratio of 1:3 at a $LiPF_6$ concentration of 1 mol/L.

Batteries 2 and 3 were produced in the same manner as the battery 1 was produced except that the above two different electrolytes were used. The battery 2 included the electrolyte containing the solvent mixture of PC and DMC. The battery 3 included the electrolyte containing the solvent mixture of EC and DMC.

(Comparative Batteries 3 and 4)

For comparison, comparative batteries 3 and 4 were produced in the same manner as the battery 1 was produced except that the negative electrode was produced as follows and that the above-prepared two different electrolytes were used. The comparative battery 3 included the electrolyte containing the solvent mixture of PC and DMC. The comparative battery 4 included the electrolyte containing the solvent mixture of EC and DMC.

The process for producing the negative electrode used in the comparative batteries 3 and 4 is now described.

SiO particles (available from Shin-Etsu Chemical Co., Ltd.) having an average particle size of 2 μm were coated with carbon by thermal chemical vapor deposition (thermal CVD). The resulting carbon-coated SiO particles were mixed with PVdF as a binder at a weight ratio of 100:9 to prepare a mixture. To the thus-obtained mixture was further added NMP to prepare a negative electrode material mixture paste. This obtained paste was applied onto both surfaces of a current collector copper foil, followed by drying to produce a negative electrode having active material layers formed on both surfaces thereof. Each active material layer had a thickness of 20 μm.

(Comparative Batteries 5 and 6)

For further comparison, comparative batteries 5 and 6 were produced in the same manner as the battery 1 was produced except that the negative electrode was produced as follows and that the above-prepared two different electrolytes were used. The comparative battery 5 included the electrolyte containing the solvent mixture of PC and DMC. The comparative battery 6 included the electrolyte containing the solvent mixture of EC and DMC.

The process for producing the negative electrode used in the comparative batteries 5 and 6 is now described.

An artificial graphite (available from Mitsubishi Chemical Corporation) having an average particle size of 5 μM and PVDF as a binder were mixed at a weight ratio of 100:9 to prepare a mixture. To the mixture was further added NMP to prepare a negative electrode material mixture paste. The obtained paste was applied onto both surfaces of a current collector copper foil, followed by drying to form a coating film having a thickness of 20 μm on each surface of the current collector.

Subsequently, the current collector having graphite coating films formed on both surfaces thereof was placed in vapor deposition equipment equipped with an EB heater as shown in FIG. 4. As the targets, single silicon crystals were used. While the current collector having graphite coating films formed thereon was moved at a rate of 10 cm/min, a silicon thin film was formed on the graphite coating film. Conditions used for forming the silicon thin film were as follows:

target: single silicon crystal;

accelerating voltage of the electron beam irradiated to the single silicon crystal: −8 kV; and emission of the electron beam: 280 mA.

Further, no oxygen gas was introduced into the vapor deposition equipment.

In the same manner as above, a silicon thin film was formed on the other surface of the current collector. Each silicon thin film had a thickness of 1.5 μm.

(Evaluation)

Discharge capacity ratio at −10° C. was determined as follows.

Each battery was charged at a constant current of 40 mA until the battery voltage reached 4.2 V at an ambient temperature of 25° C. Thereafter, the ambient temperature was decreased to −10° C. In an environment of −10° C., the battery was discharged at a constant current of 40 mA until the battery voltage decreased to 2.5 V, during which the discharge capacity was measured. The rate of the obtained discharge capacity to the initial capacity expressed in percentage was denoted as discharge capacity ratio at −10° C.

The batteries 2 to 3 and the comparative batteries 3 to 6 were analyzed in terms of initial capacity, charge/discharge efficiency and discharge capacity ratio at −10° C. The results are shown in Table 2.

TABLE 2

|  | Solvent composition | Initial capacity (mAh) | Charge/ discharge efficiency (%) | Discharge capacity ratio at −10° C. (%) |
| --- | --- | --- | --- | --- |
| Battery 2 | PC:DMC = 6:4 | 241 | 83 | 82 |
| Battery 3 | EC:DMC = 1:3 | 245 | 82 | 61 |
| Comp. Battery 3 | PC:DMC = 6:4 | 0 (unable to perform discharging) | — | — |
| Comp. Battery 4 | EC:DMC = 1:3 | 205 | 61 | 59 |
| Comp. Battery 5 | PC:DMC = 6:4 | 0 (unable to perform discharging) | — | — |
| Comp. Battery 6 | EC:DMC = 1:3 | 279 | 95 | 60 |

As can be seen from Table 2, in the comparative batteries 3 and 5 having a PC-containing electrolyte, a large amount of gas was generated at the initial charge, and therefore discharging could not be performed. This is because a film composed of PC was not formed on the graphite surface during decomposition of PC on the graphite surface so that PC was kept decomposed.

In the case of the batteries having the EC-containing electrolyte, because a film composed of EC was formed on the graphite surface during decomposition of EC at the initial charge, EC was not decomposed in the subsequent cycles.

Meanwhile, the battery 2 had no problem despite the fact that it contained the PC-containing electrolyte. A comparison between the battery 2 and the battery 3 having the EC-containing electrolyte shows that the battery 2 had higher discharge capacity ratio at −10° C., and that the battery 2 had superior low temperature characteristics.

Subsequently, the batteries having the EC-containing electrolyte (i.e., the battery 3 and the comparative batteries 4 and 6) were analyzed in terms of high rate capacity ratio and capacity retention rate in the same manner as described in EXAMPLE 1. The results are shown in Table 3.

TABLE 3

|  | Solvent composition | High rate capacity ratio (%) | Capacity retention rate (%) |
| --- | --- | --- | --- |
| Battery 3 | EC:DMC = 1:3 | 95 | 88 |
| Comp. Battery 4 | EC:DMC = 1:3 | 80 | 50 |
| Comp. Battery 6 | EC:DMC = 1:3 | 85 | 73 |

As can be seen from Table 3, the comparative batteries 4 and 6 had a lower high rate capacity ratio and a lower capacity retention rate than the battery 3.

Such low cycle characteristics of the comparative batteries 4 and 6 are presumably due to the following: in the case of the comparative battery 4, because the particulate active material was used, the binding force between the active material particles as well as the binding force between the current collector and the active material particles decreased by repeated expansion and contraction of the active material; in the case of the comparative battery 6, the carbon film and the silicon were separated from each other at the interface therebetween by repeated charge and discharge.

The above results indicate that the negative electrode of the present invention does not require the combined use of the active material with carbon, and yet the negative electrode of the present invention exhibits superior high rate discharge characteristics and excellent cycle characteristics.

Example 3

In this example, an investigation was carried out on the effective range of oxygen ratio in the first layer with no or a low oxygen ratio and the effective range of oxygen ratio in the second layer with a higher oxygen ratio. The investigation was performed by changing the flow rate of the oxygen gas introduced into the vacuum chamber of the vapor deposition equipment shown in FIG. 4 and changing the oxygen gas supply time.

Battery 4

A battery 4 was produced in the same manner as the battery 1 was produced except that, in the production of the negative electrode, the flow rate of the oxygen gas was set at 30 sccm. The pressure in the vacuum chamber was $1.8 \times 10^{-4}$ Torr during the supply of the oxygen gas, and $6.0 \times 10^{-5}$ Torr during the interval of the supply of the oxygen gas.

The negative electrode active material layer formed on each surface of the current collector had a thickness of 7.1 μm. The first layer and the second layer each had a thickness of 50 nm.

Preferably, the thicknesses of the first layer and the second layer are measured using an Auger electron spectroscope (AES) and a transmission electron microscope (TEM). As a result of the measurement, the actual measured values were in close agreement with the values estimated based on the thickness of the active material layer and the opening/closure time of the solenoid valve. In this example (EXAMPLE 3) and subsequent examples (EXAMPLEs 4 to 6), the thicknesses of the first layer and the second layer are the values estimated based on the thickness of the active material layer and the opening/closure time of the solenoid valve.

Battery 5

A battery 5 was produced in the same manner as the battery 1 was produced except that the flow rate of the oxygen gas was set at 80 sccm, and that the valve opening time was set at 3 seconds and the valve closure time was set at 1 second. In the vapor deposition equipment, the pressure in the vacuum chamber was $2.2 \times 10^{-4}$ Torr during the supply of the oxygen gas, and $1.0 \times 10^{-4}$ Torr during the interval of the supply of the oxygen gas.

The negative electrode active material layer formed on each surface of the current collector had a thickness of 7.3 μm. The first layer had a thickness of 50 nm and the second layer had a thickness of 17 nm.

Battery 6

A battery 6 was produced in the same manner as the battery 1 was produced except that the flow rate of the oxygen gas was set at 15 sccm. In the vapor deposition equipment, the pressure in the vacuum chamber was $1.6 \times 10^{-4}$ Torr during the supply of the oxygen gas, and $5.0 \times 10^{-5}$ Torr during the interval of the supply of the oxygen gas.

The negative electrode active material layer formed on each surface of the current collector had a thickness of 7.0 μm. The first layer and the second layer each had a thickness of 50 nm.

Battery 7

A battery 7 was produced in the same manner as the battery 1 was produced except that the flow rate of the oxygen gas was set at 100 sccm, and that the valve opening time was set at 3 seconds and the valve closure time was set at 1 second. In the vapor deposition equipment, the pressure in the vacuum chamber was $2.8 \times 10^{-4}$ Torr during the supply of the oxygen gas, and $1.1 \times 10^{-4}$ Torr during the interval of the supply of the oxygen gas.

The negative electrode active material layer formed on each surface of the current collector had a thickness of 6.9 µm. The first layer had a thickness of 50 nm, and the second layer had a thickness of 17 nm.

The negative electrodes included in the batteries 4 to 7 were analyzed by Auger electron spectroscopy (AES). Based on the presence ratio of silicon and oxygen, the molar ratio x of oxygen to silicon for the first layer and the second layer was calculated. The results are shown in Table 4.

The batteries 4 to 7 were further analyzed in terms of initial capacity, charge/discharge efficiency, high rate capacity ratio and capacity retention rate at the 100th cycle in the same manner described previously. The results are shown in Table 5.

TABLE 4

| | x value of $SiO_x$ | |
| --- | --- | --- |
| | Layer with no or a low oxygen ratio | Layer with a high oxygen ratio |
| Battery 4 | 0.1 | 1.0 |
| Battery 5 | 0.9 | 1.9 |
| Battery 6 | 0.05 | 0.6 |
| Battery 7 | 1.2 | 1.9 |

TABLE 5

| | Initial capacity (mAh) | Charge/discharge efficiency (%) | High rate capacity ratio (%) | Capacity retention rate (%) |
| --- | --- | --- | --- | --- |
| Battery 4 | 245 | 67 | 79 | 81 |
| Battery 5 | 202 | 67 | 92 | 95 |
| Battery 6 | 260 | 83 | 75 | 73 |
| Battery 7 | 111 | 56 | 95 | 98 |

The above results show that, in the first layer and the second layer, as the oxygen ratio was increased, the high rate capacity ratio and the capacity retention rate increased, but the initial capacity and the charge/discharge efficiency were low.

The foregoing also indicates that batteries having an excellent balance of capacity, high-load discharge capacity and cycle characteristics can be obtained when the molar ratio x of oxygen in the first layer is $0 \leq x \leq 1$ and the molar ratio y of oxygen in the second layer is $1 \leq y \leq 2$.

Example 4

In this example, with the use of vapor deposition equipment as shown in FIG. 4, an investigation was carried out on the thickness of the layer with no or a low oxygen ratio and that of the layer with a higher oxygen ratio.

Battery 8

A negative electrode was produced in the same manner as the negative electrode 1 was produced except for the following.

The mass flow controller was controlled by a program such that the oxygen gas was introduced into the area between the current collector and the targets intermittently (namely, every 10 seconds: with a supply time of 10 seconds and an interval of 10 seconds). The flow rate of the oxygen gas was set at 100 sccm. The solenoid valve was kept open. The copper foil was moved at a rate of 5 cm/min. The emission of electron beam was set at 350 mA.

Using the thus-obtained negative electrode, a battery 8 was produced in the same manner as the battery 1 was produced. The negative electrode active material layer formed on each surface of the current collector had a thickness of 5.1 µm. In the vapor deposition equipment used here, the pressure in the vacuum chamber was $2.8 \times 10^{-4}$ Torr during the supply of the oxygen gas, and $4.0 \times 10^{-5}$ Torr during the interval of the supply of the oxygen gas.

Battery 9

A battery 9 was produced in the same manner as the battery 8 was produced except that the oxygen gas was introduced every 20 seconds (i.e., with a supply time of 20 seconds and an interval of 20 seconds). The negative electrode active material layer formed on each surface of the current collector had a thickness of 5.5 µm. In the vapor deposition equipment used here, the pressure in the vacuum chamber was $2.8 \times 10^{-4}$ Torr during the supply of the oxygen gas, and $4.0 \times 10^{-5}$ Torr during the interval of the supply of the oxygen gas.

Battery 10

A battery 10 was produced in the same manner as the battery 8 was produced except that the oxygen gas was introduced every 28 seconds (i.e., with a supply time of 28 seconds and an interval of 28 seconds). The negative electrode active material layer formed on each surface of the current collector had a thickness of 5.5 µm. In the vapor deposition equipment used here, the pressure in the vacuum chamber was $2.8 \times 10^{-4}$ Torr during the supply of the oxygen gas, and $4.0 \times 10^{-5}$ Torr during the interval of the supply of the oxygen gas.

Battery 11

A negative electrode was produced using vapor deposition equipment as shown in FIG. 4 under the following conditions:
  target 14a: silicon;
  target 14b: silicon dioxide;
  accelerating voltage of electron beam for heating each target: −8 kV; and
  emission of electron beam: 250 mA.

Further, the shutter 22 arranged between the target and the current collector was moved back and forth over the targets 14a and 14b such that the shutter 22 was held between the target 14a and the current collector for a certain length of time, then moved over the target 14b (i.e., between the target 14b and the current collector) and held there for another certain length of time, whereby first layers composed of silicon and second layers composed of silicon dioxide were alternately laminated. The shutter 22 was controlled such that it blocked the migration of atoms forming silicon from the silicon target 14a to the current collector for 1 second, and then the migration of atoms forming silicon dioxide from the silicon dioxide target 14b for 1 second. The current collector was moved at a rate of 5 mm/min.

Using the thus-produced negative electrode, a battery 11 was produced in the same manner as the battery 1 was produced. The negative electrode active material layer formed on each surface of the current collector had a thickness of 4.5 μm. In the vapor deposition equipment used here, the pressure in the vacuum chamber was $4.0 \times 10^{-5}$ Torr.

For the purpose of obtaining the thickness of the layer containing $SiO_x$ ($0 \leq x \leq 1$) and that of the layer containing $SiO_y$, $1 \leq y \leq 2$ in the negative electrode active material layers of the batteries 8 to 11, each of the negative electrode active material layers of the batteries 8 to 11 was analyzed by Auger electron spectroscopy (AES) by sputtering (sputtering gas: argon) from the surface of the active material layer not in contact with the current collector towards the surface of the same in contact with the current collector. Then, the thickness of the layer containing $SiO_x$ as the active material with a molar ratio x of oxygen of $0 \leq x < 1$ and that of the layer containing $SiO_y$ as the active material with a molar ratio y of oxygen of $1 \leq y \leq 2$ were estimated. The results are shown in Table 6.

TABLE 6

| | Thickness of layer containing $SiO_x$ ($0 \leq x < 1$) | Thickness of layer containing $SiO_y$ ($1 \leq y \leq 2$) |
|---|---|---|
| Battery 8 | 0.5 μm | 0.5 μm |
| Battery 9 | 0.9 μm | 1.0 μm |
| Battery 10 | 1.3 μm | 1.4 μm |
| Battery 11 | 5 nm | 7 nm |

The batteries 8 to 11 were analyzed in terms of initial capacity, charge/discharge efficiency, high rate capacity ratio and capacity retention rate in the same manner as described in EXAMPLE 1. The results are shown in Table 7.

TABLE 7

| | Initial capacity (mAh) | Charge/discharge efficiency (%) | High rate capacity ratio (%) | Capacity retention rate (%) |
|---|---|---|---|---|
| Battery 8 | 242 | 79 | 91 | 83 |
| Battery 9 | 221 | 83 | 71 | 70 |
| Battery 10 | 185 | 80 | 61 | 59 |
| Battery 11 | 238 | 71 | 96 | 95 |

It is evident from the above results that as the thicknesses of the first layer and the second layer are increased, the high rate capacity ratio and the capacity retention rate tend to be lower. It can thus be concluded that, in order to obtain relatively excellent battery characteristics, each layer preferably has a thickness of not less than 5 nm and not greater than 1 μm, more preferably not less than 5 nm and not greater than 0.5 μm.

Such low capacity retention rate appears to be caused by the following two factors: (1) when the first layer has a thickness of not less than 1 μm, distortion caused by the expansion during charge concentrates on the first layer, and therefore cracking occurs in the active material layer; (2) when the second layer has a thickness of not less than 1 μm, the electron conductivity of the active material layer becomes low and an overvoltage becomes high, and therefore non-uniform reaction proceeds in the electrode.

In the AES result of the battery 8, a partial disagreement was observed between the periodic pattern of the thickness of the first layer and that of the thickness of the second layer. This suggests that the formed first layer and second layer were partially non-continuous in a width direction and/or a length direction of the active material layer. The first layer and the second layer are believed to have a layer structure as shown in FIG. 2. From this example, it is evident that even when the active material layer comprises non-continuous layers in a width direction and/or a length direction of the active material layer, it does not affect the battery characteristics of the resulting battery.

Example 5

In this example, an investigation was carried out on the thickness of the active material layer.

Battery 12

A negative electrode was produced in the same manner as the negative electrode 1 was produced except that the flow rate of the oxygen gas was set at 50 sccm, that the solenoid valve was allowed to open every 3 seconds (i.e., valve opening time: 3 seconds, valve closure time: 3 seconds), and that the current collector was moved at a rate of 30 cm/min. Using the obtained negative electrode, a battery 12 was produced in the same manner as the battery 1 was produced. The negative electrode active material layer formed on each surface of the current collector had a thickness of 0.5 μm. The positive electrode had a thickness ⅛ times that of the positive electrode of the battery 1. The first layer and the second layer each had a thickness of 50 nm. In the vapor deposition equipment used here, the pressure in the vacuum chamber was $2.0 \times 10^{-4}$ Torr during the supply of the oxygen gas, and $8.0 \times 10^{-5}$ Torr during the interval of the supply of the oxygen gas.

Battery 13

A negative electrode was produced in the same manner as the negative electrode 1 was produced except that the flow rate of the oxygen gas was set at 100 sccm, that the solenoid valve was allowed to open every 3 seconds (i.e., valve opening time: 3 seconds, valve closure time: 3 seconds), that the current collector was moved at a rate of 3 cm/min, and that the emission of electron beam was set at 380 mA. The negative electrode active material layer formed on each surface of the current collector had a thickness of 21 μm. The first layer and the second layer each had a thickness of 0.5 μm. In the vapor deposition equipment used here, the pressure in the vacuum chamber was $2.8 \times 10^{-4}$ Torr during the supply of the oxygen gas, and $5.0 \times 10^{-5}$ Torr during the interval of the supply of the oxygen gas.

Using the thus-obtained negative electrode, a battery 13 was produced in the same manner as the battery 1 was produced.

Battery 14

A negative electrode was produced in the same manner as the negative electrode 1 was produced except that the flow rate of the oxygen gas was set at 100 sccm, that the solenoid valve was allowed to open every 3 seconds (i.e., valve opening time: 3 seconds, valve closure time: 3 seconds), that the current collector was moved at a rate of 2 cm/min, and that the emission of electron beam was set at 380 mA. The negative electrode active material layer formed on each surface of the current collector had a thickness of 30 µm. The first layer and the second layer each had a thickness of 0.5 µm. In the vapor deposition equipment used here, the pressure in the vacuum chamber was $2.8 \times 10^{-4}$ Torr during the supply of the oxygen gas, and $5.0 \times 10^{-5}$ Torr during the interval of the supply of the oxygen gas.

Using the thus-obtained negative electrode, a battery 14 was produced in the same manner as the battery 1 was produced.

Battery 15

A negative electrode was produced in the same manner as the negative electrode 1 was produced except that the flow rate of the oxygen gas was set at 100 sccm, that the solenoid valve was allowed to open every 3 seconds (i.e., valve opening time: 3 seconds, valve closure time: 3 seconds), that the current collector was moved at a rate of 1.5 cm/min, and that the emission of electron beam was set at 380 mA. The negative electrode active material layer formed on each surface of the current collector had a thickness of 36 µm. The first layer and the second layer each had a thickness of 0.5 µm. In the vapor deposition equipment used here, the pressure in the vacuum chamber was $2.8 \times 10^{-4}$ Torr during the supply of the oxygen gas, and $5.0 \times 10^{-5}$ Torr during the interval of the supply of the oxygen gas.

Using the thus-obtained negative electrode, a battery 15 was produced in the same manner as the battery 1 was produced.

The batteries 12 to 15 were analyzed in terms of initial capacity, charge/discharge efficiency, high rate capacity ratio and capacity retention rate in the same manner as described in EXAMPLE 1. The results are shown in Table 8.

TABLE 8

| | Active material layer thickness (µm) | Initial capacity (mAh) | Charge/discharge efficiency (%) | High rate capacity ratio (%) | Capacity retention rate (%) |
|---|---|---|---|---|---|
| Battery 12 | 0.5 | 98 | 87 | 98 | 98 |
| Battery 13 | 21 | 205 | 80 | 82 | 91 |
| Battery 14 | 30 | 178 | 71 | 61 | 75 |
| Battery 15 | 36 | 149 | 60 | 41 | 58 |

It can be seen from Table 8 that a preferred thickness of the negative electrode active material layer is not greater than 30 µm, more preferably not greater than 20 µm because the active material layer having such a thickness exhibited relatively high levels in terms of charge/discharge efficiency, high rate capacity ratio and capacity retention rate.

It is possible to reduce the thickness of the negative electrode active material layer to less than 0.5 µm. In that case, the positive electrode active material layer should be made thin so as to keep a balance with the capacity of the negative electrode. The method for producing a positive electrode described previously in this specification, however, cannot provide a positive electrode active material layer having a thickness that corresponds to a negative electrode active material layer thickness of less than 0.5 µm. Even if it is possible, the battery capacity will be significantly low, failing to take advantage of the characteristics of high-capacity silicon. Preferably, the negative electrode active material layer formed on each surface of the current collector has a thickness of 0.5 µm or greater. Although the battery 12 whose negative electrode active material layer had a thickness of 0.5 µm had a low capacity, its high rate capacity ratio was extremely high. This type of battery is promising for applications that require high power output.

Example 6

In this example, an investigation was carried out on the characteristics of negative electrodes produced by methods other than those described above.

Battery 16

A negative electrode was produced in the same manner as the negative electrode 1 was produced except for the following.

The flow rate of the oxygen gas was set at 100 sccm. The solenoid valve was allowed to open every 1 second (i.e., valve opening time: 1 second, valve closure time: 1 second). In the vapor deposition equipment used here, the pressure in the vacuum chamber was $2.0 \times 10^{-4}$ Torr during the supply of the oxygen gas, and $1.0 \times 10^{-4}$ Torr during the interval of the supply of the oxygen gas.

The current collector was moved at a rate of 40 cm/min. The emission of electron beam was set at 450 mA.

In FIG. 4, as a means 21 for converting the oxygen gas to plasma, an electron beam irradiator was used. In the electron beam irradiator, the accelerating voltage of electron beam was set at −4 kV, and the emission of electron beam was set at 20 mA. The oxygen gas introduced intermittently was converted to plasma by the electron beam irradiator.

Using the thus-obtained negative electrode, a battery 16 was produced in the same manner as the battery 1 was produced. The negative electrode active material layer formed on each surface of the current collector had a thickness of 6.7 µm. The first layer and the second layer each had a thickness of 0.3 µm.

Battery 17

A negative electrode was produced in the same manner as the negative electrode 1 was produced except for the following.

In vapor deposition equipment equipped with an electron beam heating means as shown in FIG. 4, silicon was used as the target 14*a*, and silicon dioxide was used as the target 14*b*. An electron beam was irradiated to the targets 14*a* and 14*b* separately for 3 seconds under the following conditions:
  accelerating voltage of electron beam: −8 kV; and
  emission of electron beam: 300 mA.

Using the thus-obtained negative electrode, a battery 17 was produced in the same manner as the battery 1 was produced. The negative electrode active material layer formed on each surface of the current collector had a thickness of 5 µm. The first layer and the second layer each had a thickness of 50 nm.

Battery 18

A negative electrode was produced with the use of sputtering equipment (available from ULVAC, Inc.) equipped with a means for moving a current collector including a feeding roller for feeding a current collector, can roller, a winding roller and rollers, and the like as shown in FIG. 5.

The negative electrode was produced essentially as described previously.

As the current collector, an electrolytic copper foil (available from Furukawa Circuit Foil Co., Ltd.) having a width of 10 cm, a thickness of 35 μm and a length of 50 m was used. The copper foil was fed from a feeding roller 11 through the outer surface of a can roller 12 to a winding roller 13 having an empty reel where the copper foil was wound. The copper foil was moved at a rate of 1 mm/min.

As the sputtering gas, argon gas having a purity of 99.999% (available from Nippon Sanso Corporation) was used. The flow rate of the argon gas was set at 100 sccm. The pressure in the vacuum chamber (not shown in the drawing) while the argon gas was introduced was 0.1 Torr.

As targets 31a and 31b, single silicon crystals having a purity of 99.9999% (available from Shin-Etsu Chemical Co., Ltd.) were used.

The output of a high frequency power supply (not shown in the drawing) for sputtering the targets 31a and 31b was set at 2 kW.

As the oxygen gas, oxygen gas having a purity of 99.7% (available from Nippon Sanso Corporation) was used. The flow rate of the oxygen gas from an oxygen nozzle 18 was set at 30 sccm. A mass flow controller 19 was controlled by a program such that the oxygen gas was introduced every 12 seconds (i.e., with a supply time of 12 seconds and an interval of 12 seconds). In the sputtering equipment used here, the pressure in the vacuum chamber while the oxygen gas was introduced was 0.12 Torr. The pressure in the vacuum chamber while the oxygen gas was not introduced was 0.1 Torr.

Under the conditions given above, an active material layer comprising first layers comprising silicon or silicon and a small amount of oxygen and second layers comprising silicon and a larger amount of oxygen than the first layer alternately laminated therein was formed. The negative electrode active material layer formed on each surface of the current collector had a thickness of 5 μm. The first layer and the second layer each had a thickness of 20 nm.

Using the thus-obtained negative electrode, a battery 18 was produced in the same manner as the battery 1 was produced.

The ratio between Si and O in a thickness direction of the active material layer was determined by Auger electron spectroscopy (AES). As a result, the negative electrode active material layer of the battery 18 showed a similar change in the ratio between Si and O to that of the negative electrode active material layer of the battery 1.

Battery 19

A negative electrode active material layer was formed in the same manner as described in the production of the battery 18 except that the negative electrode active material layer was formed while the current collector was held at a standstill. The negative electrode active material layer formed on each surface of the current collector had a thickness of 5.7 μm. The first layer and the second layer each had a thickness of 20 nm.

Since the active material layer was formed while the current collector was held at a standstill, the resulting active material layer had a laminate structure as shown in FIG. 1 in which the first and second layers were parallel to the axis parallel to a length direction of the current collector.

Using the thus-produced negative electrode plate, a laminate type battery was produced as follows.

The negative electrode plate was cut such that the active material layer had an area of 37 mm×37 mm. Thereby, a negative electrode was produced. A nickel negative electrode lead was connected to an exposed portion of the copper foil. Then, a polypropylene tape was attached onto the lead to fix the negative electrode lead to the copper foil.

A positive electrode was produced in the same manner as described in the production of the battery 1. The active material layer of the produced positive electrode had a size of 35 mm×35 mm. An aluminum positive electrode lead was connected to an exposed portion of the positive electrode current collector.

The thus-produced positive electrode and negative electrode were laminated with a 25 μm thick polypropylene microporous separator (#2500 available from Celgard Inc.) interposed therebetween to produce a laminate type electrode group. In the produced electrode group, the ends of the positive electrode active material layer were positioned 1.0 mm in from the ends of the negative electrode active material layer.

The obtained electrode group was then dried in a vacuum dryer at 60° C. for 12 hours so as to reduce the amount of water contained in the electrode group to 50 ppm or less.

Subsequently, the dried electrode group was housed in an outer case formed from a 50 μm thick laminate sheet. The laminate sheet used here was an aluminum foil having a film of modified polyethylene resin formed on each surface thereof.

An electrolyte, the same one used in the production of the battery 1, was then vacuum-injected into the outer case. Then, the opening of the outer case was sealed together with the positive and negative electrode leads using a resin. Thereby, a battery was produced. The battery was denoted as battery 19.

The batteries 16 to 19 were analyzed in terms of initial capacity, charge/discharge efficiency, high rate capacity ratio and capacity retention rate at the 100th cycle in the same manner as described in EXAMPLE 1. The results are shown in Table 9.

TABLE 9

|  | Initial capacity (mAh) | Charge/discharge efficiency (%) | High rate capacity ratio (%) | Capacity retention rate (%) |
| --- | --- | --- | --- | --- |
| Battery 16 | 239 | 86 | 92 | 91 |
| Battery 17 | 203 | 78 | 90 | 95 |
| Battery 18 | 245 | 90 | 80 | 85 |
| Battery 19 | 21 | 87 | 90 | 90 |

A comparison between the results of the battery 18 and those of the battery 1 presented in Table 1 shows that negative electrodes having similar performance can be obtained regardless of using vapor deposition equipment or sputtering equipment.

Further, a comparison between the results of the battery 18 and those of the battery 19 shows that negative electrodes having similar performance can be obtained regardless of whether the current collector is moved or not during the formation of the active material layer. In the case of forming the negative electrode active material layer while the current collector is moved, in the resulting negative electrode active material layer, the axis parallel to a length direction of the first and second layers is tilted at a certain angle relative to the axis parallel to a length direction of the current collector as shown in FIG. 3. In the case of forming the negative electrode active material layer while the current collector is held at a standstill, in the resulting negative electrode active material layer, the axis parallel to a length direction of the first and second layers is parallel to the axis parallel to a length direction of the current collector as shown in FIG. 1. In short, the battery performance is not affected by whether the first and second layers are tilted or not.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium ion secondary battery comprising a current collector and an active material layer carried on said current collector,
    wherein said active material layer comprises a first layer and a second layer alternately laminated in a thickness direction of said active material layer,
    said first layer comprising an active material represented by $SiO_x$ ($0.1 \leq x \leq 0.9$) and said
    second layer comprising an active material represented by $SiO_y$ ($1 \leq y \leq 2$).

2. The negative electrode for a lithium ion secondary battery in accordance with claim 1,
    wherein said first layer has a thickness of Ta of 5 nm to 1 μm and said second layer has a thickness Tb of 5 nm to 1 μm.

3. The negative electrode for a lithium ion secondary battery in accordance with claim 1,
    wherein said active material layer has a thickness of T of 0.5 μm to 30 μm.

4. The negative electrode for a lithium ion secondary battery in accordance with claim 1,
    wherein at least one of said first layer and said second layer is a non-continuous layer having a defect portion, and said defect portion is occupied by the other layer.

5. A lithium ion secondary battery comprising a positive electrode, the negative electrode in accordance with claim 1, a separator disposed between said positive electrode and said negative electrode, and an electrolyte.

* * * * *